United States Patent [19]

Santoro et al.

[11] Patent Number: 5,021,634
[45] Date of Patent: Jun. 4, 1991

[54] TEMPERATURE CONTROLLED SOLDERING IRON EMPLOYING A VARIABLE RESISTANCE HEATING ELEMENT FOR TEMPERATURE SENSING

[76] Inventors: Giovanni Santoro, via campodimele 55, 00189 Rome; Emmanno Francolini, via Campo Ligure, 19 -00168 Rome, both of Italy

[21] Appl. No.: 229,328
[22] PCT Filed: Nov. 4, 1987
[86] PCT No.: PCT/IT87/00091
§ 371 Date: Jul. 5, 1988
§ 102(e) Date: Jul. 5, 1988
[87] PCT Pub. No.: WO88/03455
PCT Pub. Date: May 19, 1988

[30] Foreign Application Priority Data

Nov. 5, 1986 [IT] Italy ................ 48621 A/86

[51] Int. Cl.[5] .......................... H05B 1/02; B23K 3/02
[52] U.S. Cl. .................................... 219/241; 219/499; 219/501; 219/505; 228/51
[58] Field of Search .............. 219/241, 497, 499, 501, 219/505; 228/51-55

[56] References Cited

U.S. PATENT DOCUMENTS

| 915,974 | 3/1909 | Leonard | 219/241 X |
|---|---|---|---|
| 3,679,871 | 7/1972 | Evalds | 219/241 X |
| 3,789,190 | 1/1974 | Orosy et al. | 219/499 X |
| 4,089,336 | 5/1978 | Cage et al. | 219/241 X |
| 4,507,546 | 3/1985 | Fortune et al. | 219/501 X |
| 4,546,238 | 10/1985 | Ahs | 219/499 X |
| 4,590,363 | 5/1986 | Bernard | 219/497 |
| 4,766,289 | 8/1988 | Santoro et al. | 219/497 X |

FOREIGN PATENT DOCUMENTS

| 4035 | 9/1979 | European Pat. Off. . |
| 102315 | 3/1984 | European Pat. Off. . |
| 2263018 | 7/1984 | Fed. Rep. of Germany . |
| 3513857 | 10/1986 | Fed. Rep. of Germany . |
| 61-74773 | 4/1986 | Japan ................ 219/241 |

OTHER PUBLICATIONS

"Temperature Controlled Soldering Iron", by Planmen Pazov, ETI, May 1981, vol. 10, No. 8, pp. 24–27.

Primary Examiner—Anthony Bartis
Attorney, Agent, or Firm—DeLio & Associates

[57] ABSTRACT

A temperature controlled soldering iron with a heating element having a positive temperature coefficient arranged as one leg of a Wheatstone resistance bridge such that the voltage across the heating element signals the temperature of the soldering iron. A comparator is connected across opposite nodes of the bridge and turns off a switching element to cut current flow through the bridge when the heating element is above the desired temperature. A pulse generator continuously supplies pulses to briefly restart current flow through the bridge and allow the temperature to be sensed. The pulses are short duration and occur regardless of whether the comparator has previously turned off current flow, and independent of the temperature of the heating element. After each pulse the comparator controls current flow by leaving the flow on or turning it off according to the temperature of the heating element as measured by comparison of the voltages on the opposite nodes of the bridge.

5 Claims, 1 Drawing Sheet

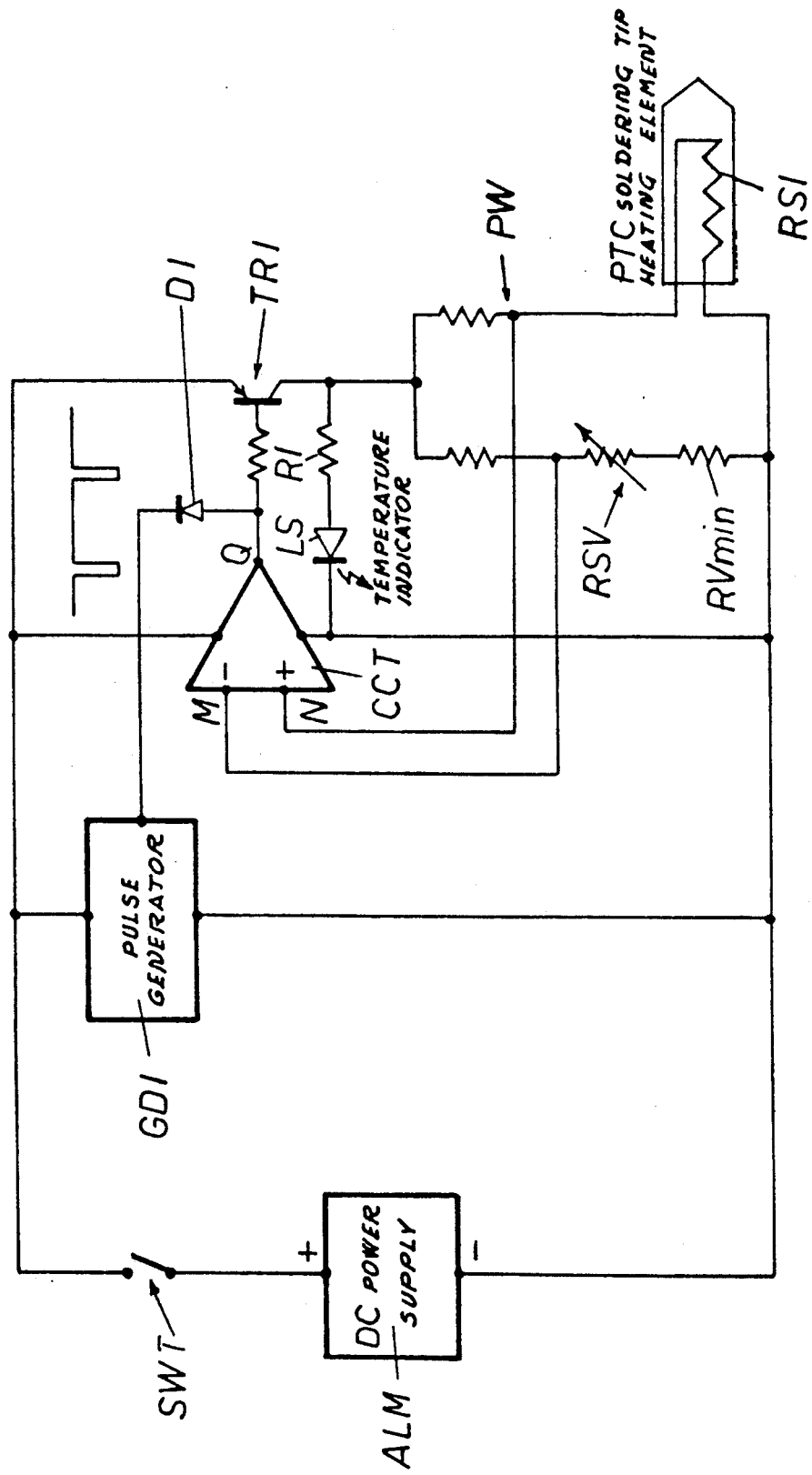

TEMPERATURE CONTROLLED SOLDERING IRON EMPLOYING A VARIABLE RESISTANCE HEATING ELEMENT FOR TEMPERATURE SENSING

This invention relates to a temperature-controlled soldering iron especially adapted for soft soldering, silver soldering and the like, the power of which is varying. as a function of the thermal energy absorbed by the soldering tip, the sensing means for measuring the soldering temperature being formed of the same resistor supplying thermal energy to the soldering tip. Furthermore, the soldering iron of the invention has a very low thermic inertia so that the supplied power is immediately adapted to the required power.

Soldering irons available at the present time to carry out soft solderings are essentially of three different types: The so called quick or gun soldering irons with control switch adapted almost to soft soldering and having a soldering tip reaching very quickly the operating temperature corresponding to the melting temperature of the solder. Such soldering irons have a voltage transformer with the secondary winding connected to the soldering tip.

Soldering irons of the second type have a continuously energized resistance and soldering irons of the third type almost are the same as those of the second type with the provision of a thermostat controlling the power supply to the resistance and interrupting it when the soldering tip reaches an excessive temperature. All these soldering irons give troubles that do not allow satisfactory solderings to be carried out.

In fact soldering irons of the first type or quick soldering irons operate at varying soldering temperatures and with constant power so that soldering tip can also reach a very higher temperature than the melting temperature of the solder, which may cause the latter to "burn" and to "form alloy" with the soldering tip which may become inoperative.

. Also soldering irons of the second type in which the temperature control occurs by heat dissipation in the room suffer of the same trouble of reaching very easily temperatures such as to burn the solder and to cause the latter to form alloy with the soldering tip.

Finally soldering irons of the third type have the essential drawback due to the high thermic inertia of the structure, even if they theoretically have the advantage that the soldering temperature is held by the thermostat substantially constant. The drawback resides in that sensing means and heating means are two different elements with the consequence of an unavoidable delay in the reciprocal adaptation to the sensed and caused temperature variations. This causes an overshoot i.e., an oscillation over and below the predetermined temperature which is very undesiderable especially in the soldering of delicate components so that the advantages of such soldering irons are more theoretical than practical.

Therefore the use of the soldering irons available at the present time gives rise to considerable troubles. As a consequence of above, in the use of such soldering irons in circuits comprising electronic components determinate precautions prolonging operating time and cost should be taken.

This invention seeks, therefore, to provide a soldering iron completely free from the drawbacks of the soldering irons available at the present time.

The soldering iron of the invention comprises a soldering tip temperature control circuit controlling automatically the supplied power according to the power absorbed by the soldering, with the consequence that the predetermined soldering decrease being in practice negligible.

The soldering iron of the invention is temperature controlled by means of a heating element having a resistance which varies as a function of temperature, mounted in close thermal contact with the soldering iron tip. A Wheatstone resistance bridge includes the resistive heating element as one leg thereof, and a DC power supply supplies power to the bridge and to the heating element therein. A switch means is connected to the bridge and includes a control lead for switching on and off current flow through the bridge. A comparator includes two inputs connected to opposite nodes of the bridge and an output connected to the control lead of the switch means, the comparator acting to turn off the switch means when the heating element is above the desired temperature, as indicated by the relative voltage of the input nodes, or to leave on the switch means when the heating element is below the desired temperature.

A pulse generator continuously generates brief pulses at prefixed time intervals and is connected to the control lead of the switch means to turn on the switch means at the prefixed time intervals regardless of whether the comparator has previously turned off the switch means. At the conclusion of each brief pulse, control is returned to the comparator which once again either leaves on the switch means or turns off the switch means.

The soldering iron of this invention is now described in detail with reference to the annexed drawing, the sole view of which shows the schematic circuit diagram thereof.

The soldering iron comprises in combination: a switch SWT; a d.c. power supply of the known type formed of the block ALM; a voltage comparator CCT; a power transistor TR1; a Wheatstone bridge designated by PW, a branch of which is provided with a resistor RS1 supplying serving as a heating element for thermal energy to the soldering tip (not shown in the diagram), and the branch opposite to said first-mentioned branch is provided with a selectively variable temperature setting resistor RSV having a minimum constant value equal to $RV_{min}$ which is different from zero; a pulse generator GDI gating pulses at prefixed time intervals; and a warning lamp LS indicating that the soldering iron is in the on-state and that the predetermined soldering temperature has been reached.

It should be noted that resistor RS1 is such that it has a positive temperature coefficient of resistance (PTC), i.e., its ohmic resistance increases with an increase in temperature.

The operation of such soldering iron is as follows: when the soldering iron is switched on, pulse generator GDI is activated, thus generating short negative pulses, the first of which applied to the base of transistor TR1 through coupling diode D1 and protection resistor R1 enables transistor TR1 supplying Wheatstone bridge PW and resistor RS1.

Thus a current is passed in bridge PW and consequently a voltage is supplied at inputs M and N of the voltage comparator CCT.

As resistor RS1 is cold at switching on, its ohmic resistance is relatively low so that the voltage at input M is greater than at input N of voltage comparator CCT. Under such conditions the output of comparator CCT is zero, so that transistor TR1 is in the on-state also after the starting pulse is over.

Such operating conditions are steady, so that the successive pulses of pulse generator GDI are ineffective and do not change the state of the transistor till ohmic resistance RS1 which is warming up reaches a value such as to balance the bridge, so that voltages equal to each other are applied at inputs M and N of voltage comparator CCT.

However, any further increase of temperature of resistor RS1 will set the voltage applied at input M to a lower level than the voltage applied at input N, so that the output of voltage comparator is positive, thus leading transistor TR1 to the offstate. Consequently, the power supply to Wheatstone bridge PW and then to RS1 heating the soldering tip is interrupted.

Under such conditions all pulses of pulse generator GDI lead transistor TR1 to the on-state, however, in theory only for a period of time equal to the length of such pulses. In practice transistor TR1 remains in the on-state for a longer time, because inputs M and N are under the same conditions as at switching on of the soldering iron, even if for a shorter period of time than the time interval between pulses generated by pulse generator GDI, as resistor RS1 is in the meanwhile slightly cooled.

Such "power supply pulse" operation holds temperature of soldering tip substantially constant as the power absorbed by the soldering varies, so that the on-times..of transistor TR1 controlled by each pulse of pulse generator GDI will be longer as more power is requested by the soldering tip.

It is self-evident from the above that warning lamp LS is continuously switched on till resistor RS1 has reached the operating temperature and then the lighting thereof will be intermittent as a consequence of the intermittent power supply of the Wheatstone bridge.

The temperature of the soldering tip is selected by operating the selectively variable resistor RSV. Of course, it is determined by the requirements of the soldering to be carried out by the soldering iron.

As far as the soldering tip is concerned, as it is self-evident to the skilled in the art, it should be in tight thermal contact with resistor RS1 supplying thermal energy to avoid undue drops in temperature even if it has to be electrically insulated therefrom.

The soldering iron of the invention may also be constructed with a resistor RS1 having a negative temperature coefficient by reversing the connections of the two inputs M and N of the Wheatstone bridge. However, the use of a material having a positive temperature coefficient is preferred because it offers the advantage that the soldering tip reaches the operating temperature in a much shorter time than one operated with a negative temperature coefficient heating element.

We claim:

1. A temperature controlled soldering iron comprising:
   a heating element having a resistance which varies as a function of temperature, mounted in close thermal contact with a soldering iron tip;
   a Wheatstone resistance bridge including the resistive heating element as one leg thereof;
   a DC power supply for supplying power to the bridge and to the heating element therein;
   a switch means connected to the bridge and having a control lead for switching on and off current flow through the bridge;
   a comparator having two inputs connected to opposite nodes of the bridge and an output connected to the control lead of the switch means, the comparator acting to turn off the switch means when the heating element is above the desired temperature as indicated by the relative voltage of the input nodes or to leave on the switch means when the heating element is below the desired temperature; and
   a pulse generator continuously generating brief pulses at prefixed time intervals and connected to the control lead of the switch means to turn on the switch means at the prefixed time intervals regardless of whether the comparator has previously turned off the switch means and then leave control of the switch means to the comparator until the next time interval.

2. A temperature controlled soldering iron according to claim 1 wherein one of the resistive legs of the bridge is a variable resistance such that varying the variable resistance adjusts the temperature of the soldering iron.

3. A temperature controlled soldering iron according to claim 1 wherein the switch means is a transistor.

4. A temperature controlled soldering iron according to claim 1 further including a warning lamp connected to the bridge so that the lamp is on when the switch means is on and power is being supplied to the heating element.

5. A temperature controlled soldering iron according to claim 1 wherein the heating element has a positive temperature coefficient.

* * * * *

UNITED STATES PATENT AND TRADEMARK OFFICE
CERTIFICATE OF CORRECTION

PATENT NO. : 5,021,634

DATED : JUNE 4, 1991

INVENTOR(S) : SANTORO ET AL.

It is certified that error appears in the above-identified patent and that said Letters Patent is hereby corrected as shown below:

Column 2, Line 5, after "soldering" insert -- temperature is never overcome, the variations on the ----.

Signed and Sealed this

Fifteenth Day of September, 1992

Attest:

DOUGLAS B. COMER

Attesting Officer      Acting Commissioner of Patents and Trademarks